(12) United States Patent
Nishioka

(10) Patent No.: US 6,530,679 B1
(45) Date of Patent: Mar. 11, 2003

(54) LIGHT EMITTING DEVICE

(76) Inventor: Yoichi Nishioka, c/o Dynaflo Co., Ltd., 2-9-20, Koyama, Shinagawa-ku, Tokyo (JP)

(*) Notice: Subject to any disclaimer, the term of this patent is extended or adjusted under 35 U.S.C. 154(b) by 0 days.

(21) Appl. No.: 09/596,949

(22) Filed: Jun. 16, 2000

(30) Foreign Application Priority Data

Jun. 18, 1999 (JP) ............................................ 11-172253
Sep. 28, 1999 (JP) ............................................ 11-275291
Apr. 7, 2000 (JP) ....................................... 2000-106828

(51) Int. Cl.$^7$ ................................................. F21V 5/02
(52) U.S. Cl. ....................... 362/339; 362/338; 362/340; 362/334; 362/331; 362/337; 362/336; 362/332; 362/335; 362/237; 362/240; 362/800
(58) Field of Search ................................. 362/339, 340, 362/331, 235, 330, 236, 336, 237, 337, 240, 332, 244, 369, 286, 287, 231, 800, 335, 246, 338, 334

(56) References Cited

U.S. PATENT DOCUMENTS

| | | | | |
|---|---|---|---|---|
| 1,440,733 A | * | 1/1923 | Guth | ........................... 362/309 |
| 5,032,963 A | * | 7/1991 | Granstrom | ................... 362/337 |
| 5,803,579 A | * | 9/1998 | Turnbull et al. | ............ 362/83.1 |

FOREIGN PATENT DOCUMENTS

| | | |
|---|---|---|
| JP | 5-15209 | 2/1993 |
| JP | 11-176220 | 7/1999 |

* cited by examiner

Primary Examiner—Stephen Husar
Assistant Examiner—Bertrand Zeade
(74) Attorney, Agent, or Firm—Christensen O'Connor Johnson Kindness pllc

(57) ABSTRACT

There is provided a light emitting device in this invention comprises a light source for supplying light, and plural light scattering devices disposed in front of the light source so as to be opposite to the direction of the light. Each of the light scattering devices comprises at least one striated surface forming plural prisms. The light is scattered by means of the prisms of the light scattering devices.

This invention enables a light emitting device to achieve the spread of light with comparatively little light clustering. In particular, the light emitted from a local source can be changed from being directional to being non-directional even in case of use of the LED's source of light which is directional and so on. Therefore, the light emitting device pertaining to this invention is suitably adopted for use in the display of guardrails on the road. Moreover, in the case of using LED elements as the source of light, since LED's have a long lifetime and low power consumption, the device can be provided using a solar battery as a power source, thereby eliminating the trouble of battery replacement. Moreover, the adoption of the LED makes it easy to obtain the required power from a battery, and to eliminate defects such as broken wires caused by vehicular traffic, because conventional electric wires for supplying power are not required. Therefore, for example, the light emitting device with regard to this invention is suitable for use as an alarm light at construction sites.

16 Claims, 13 Drawing Sheets

LIGHT EMITTING DEVICE

BACKGROUND OF THE INVENTION

1. Field of the Invention

This invention relates to a light emitting device.

2. Relevant Art

There are known technologies for dispersing and spreading light from a light source. For instance, Japanese Patent Laid-open Publication No. (Tokkai-Hei) 11-176220 discloses a technology which obtains the spread of light by reflecting the light and further dispersing the light two times. This technology has, however, a problem in that the amount of light is reduced because the light is reflected and the structure is apt to become complicated and large-sized.

Aside therefrom, Japanese Utility ModelLaid-open Publication No. (Jikkai-Hei) 5-15209 discloses the technology for achieving the spread of light by stacking a milky-white board and prism film. This technology has, however, a disadvantage in that the effect of scattering is insufficient, and therefore, the source of light can be seen as a dot shape in case of use of a point source of light such as LED element.

Therefore, the inventor has experimented in various ways and observed that he obtained the spread of light even in case of use of a point light source by stacking two or more scattering sheets (two sheets, for example) with striated surfaces forming plural prisms.

SUMMARY OF THE INVENTION

It is therefore an object of the present invention to provide a light emitting device capable of achieving the spread of a light source with comparatively little clustering even in the case of use of a local source of light such as a point light source or a linear light source. A light emitting device in this invention comprises a light source for supplying light, and plural light scattering devices disposed in front of the light source so as to be opposite to the direction of the light. Each of the light scattering devices comprises at least one striated surface forming plural prisms. The light is scattered by means of the prisms of the light scattering devices.

This invention enables a light emitting device to achieve the spread of light with comparatively little light clustering. In particular, the light emitted from a local source can be changed from being directional to being non-directional even in case of use of the LED's source of light which is directional and so on (not limited to this type of light source). Therefore, the light emitting device pertaining to this invention is suitably adopted for use in the display of guardrails on the road. Moreover, in the case of using LED elements as the source of light, since LED's have a long lifetime and low power consumption, the device can be provided using a solar battery as a power source, thereby eliminating the trouble of battery replacement. Moreover, the adoption of the LED which emits light using little power makes it easy to obtain the required power from a battery, and to eliminate defects such as broken wires caused by vehicular traffic, because conventional electric wires for supplying power are not required. Therefore, for example, the light emitting device with regard to this invention is suitable for use as an alarm light at construction sites.

DETAILED DESCRIPTION OF THE PREFERRED EMBODIMENTS

Figure 1:
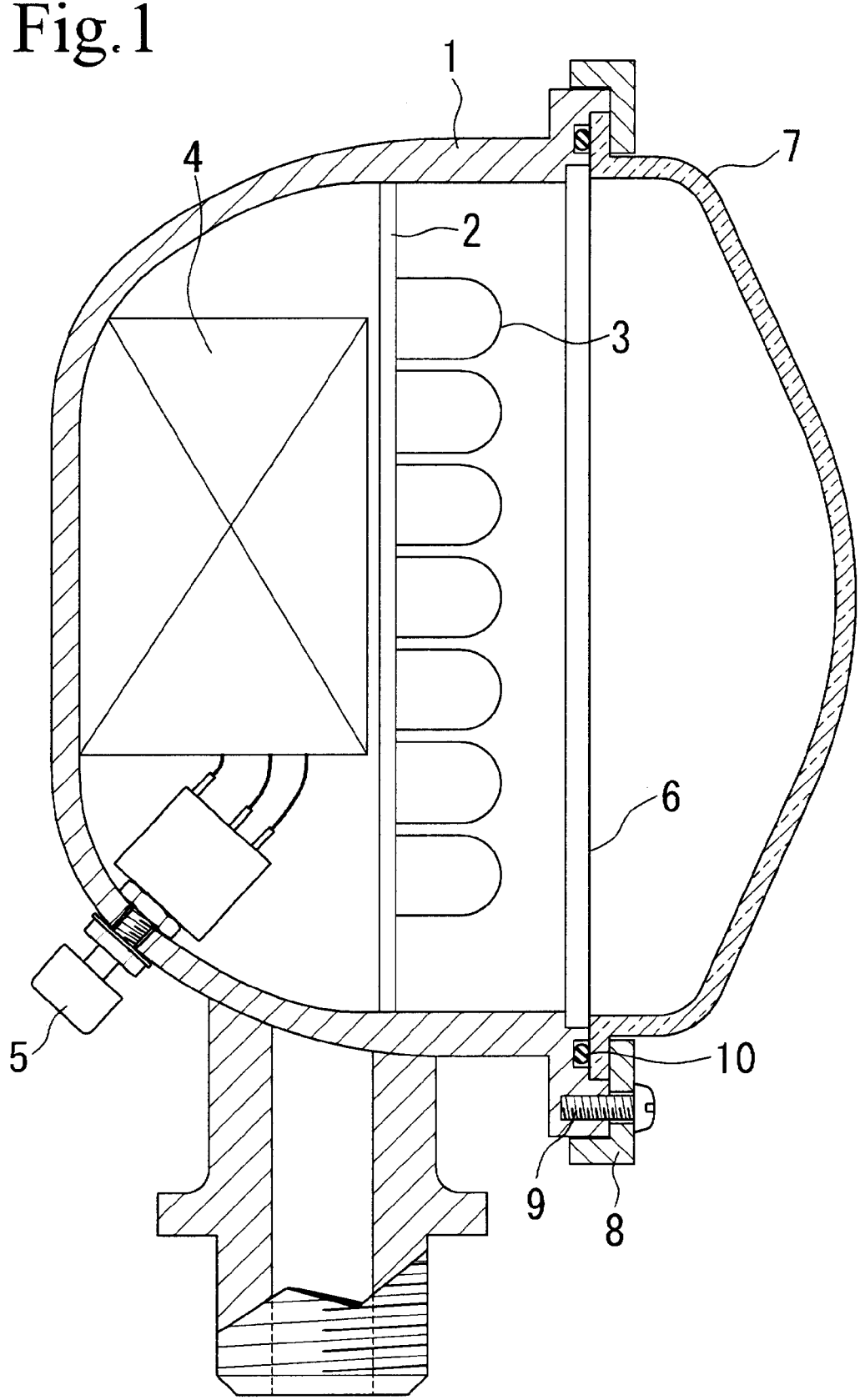
FIG. 1 shows a cross section of the light emitting device according to the first embodiment of this invention.
Figure 2:
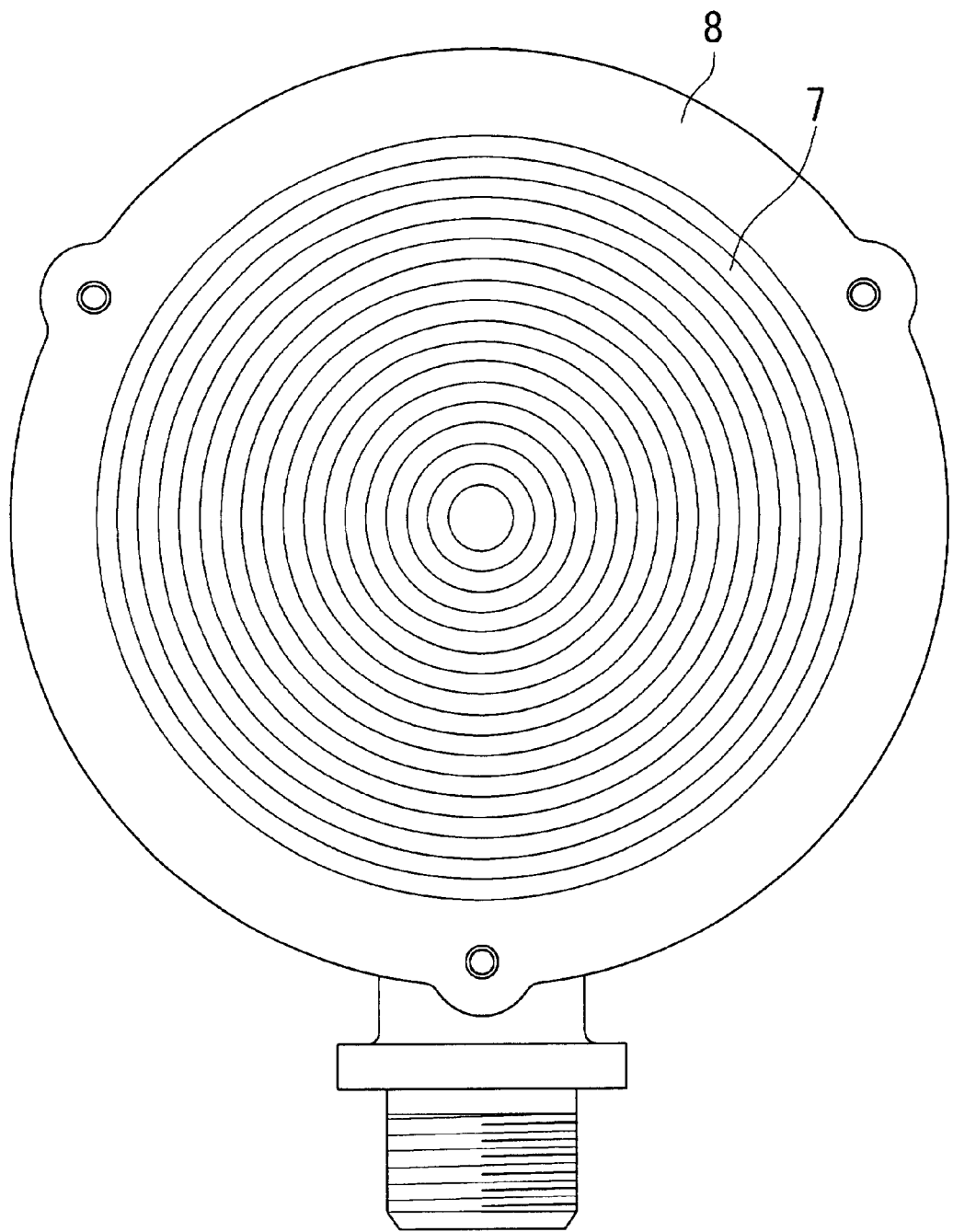
FIG. 2 is a front view of the light emitting device of FIG. 1.
Figure 3A:
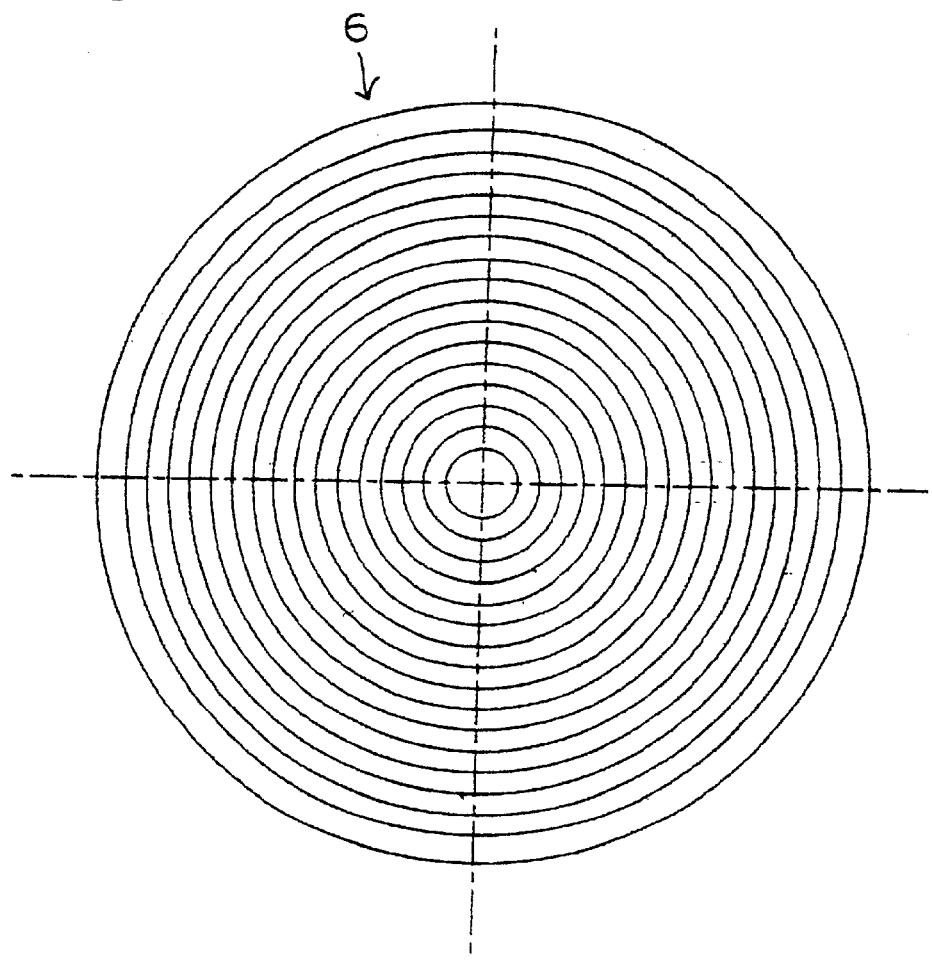
FIG. 3(a) is a front view of the first light scattering plate used in the first embodiment.

The light emitting device of the first embodiment of this invention is explained in detail based on FIGS. 1 to 3.

FIG. 1 is a cross section where the light emitting device is seen from the side thereof. The light emitting device has a main cover 1 with a bowl-like shape opened at one side. A disc shaped main plate (main body) 2 is installed inside the main cover 1. Two or more LED elements 3 are densely set on one side of the main plate 2. A battery control box (power unit) 4 is laid at the other side of main plate 2 to blink the LED elements 3. The battery control box 4 can be freely operated by switch 5 exposed on the outside of the main cover 1 and it is designed to provide LED elements 3 from the battery control box 4 with power by way of the switch 5.

A first light scattering plate 6 (corresponding to the light scattering device) is installed to conceal the opening of the main cover 1, situated in front of the plural LED elements 3 equipped on the main plate 2. The light scattering plate 6 has a thin discoid shape, and one side thereof has striated concentric wavy circles forming plural prisms thereon. A second convex light scattering plate 7 (corresponding to the light scattering device) is set in the opening of the main cover 1 placed further outside of the first scattering plate 6. Concentric wavy circles are made on one side of the second light scattering plate 7 in a manner similar to those on the first light scattering plate 6. The second light scattering plate 7 is fixed to the marginal rib of the opening of the main cover 1 through a suppression ring 8 and a fastening screw 9. Symbol 10 shown in the figures denotes an O-ring.

Figure 3B:
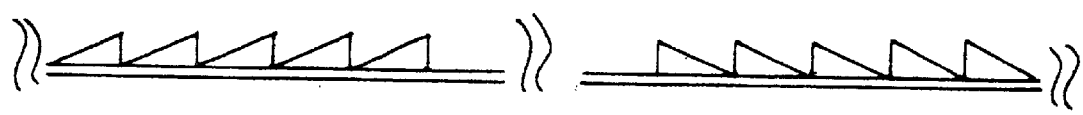
FIG. 3(b) is a cross sectional view of a part of the first light scattering plate used in the first embodiment.

FIG. 2 and FIG. 3 show front views of the light scattering plates 6 and 7 respectively. Light scattering plates 6 and 7 are semi-transparent, and the striated ridge lines on the reverse side can be seen through in FIG. 2 and FIG. 3. As shown in FIG. 3(b), the cross-sectional shape of the striated surface is triangular, and plural slopes are formed inclined against the surface on the side of the light scattering plate 6. The form of striation of the surface should not be limited. The striations can also be formed on the opposite side of the light scattering plates 6 and 7, either alternatively or additionally. The striated surface formed in the light scattering plate 7 has a similar shape to that shown in FIG. 3(b).

The light scattering plates 6 and 7 are made from a resin which is suitably selected from well-known resins such as polycarbonates, acrylics, and polypropylenes, etc. In addition, dispersion materials by which light is scattered are mixed into the light scattering plates 6 and 7. Dispersion materials are suitably selected from among those which are well-known. For instance, the mixture of a glass powder with a diameter of 0.5 micrometer and clay can be used as the dispersion material in this embodiment. In this embodiment, the light scattering boards 6 and 7 are made as milky-white half transparent boards. The light scattering plate can be made a colored semi transparency by mixing the resin with pigment, without limiting to a milky-white color. In this case, a preferable color can be obtained. It can be used, for instance, for the signal lights. Light emitted from LED 3 is scattered by two or more concentric circle striations formed on the back of the light scattered board 6 and 7, functioning as a prism. Such light scattering plates 6 and 7 themselves can be those which are already known.

It was observed by the inventor that a single use of a light scattering plate placed in front of an LED light source allowed the point light source of each LED to be seen clearly, through experimentation. On the other hand, the arrangement of two sheets of light scattering plates gave the satisfactory result of spreading the light over the surface because point light sources are difficult to discern as light emitted from separate LED light sources.

Figure 4:
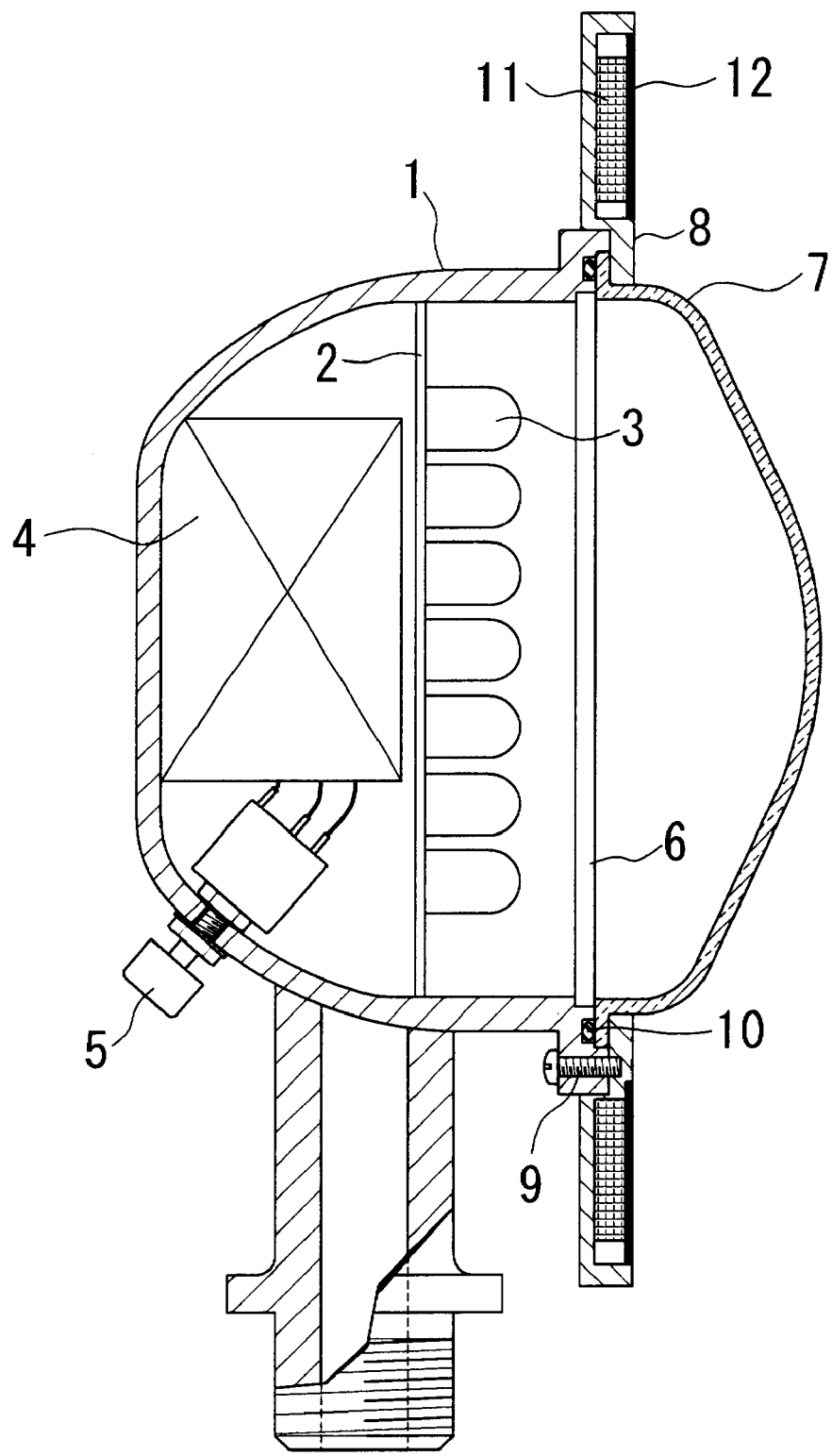
FIG. 4 is a side cross section of the light emitting device according to the second embodiment of this invention.
Figure 5:
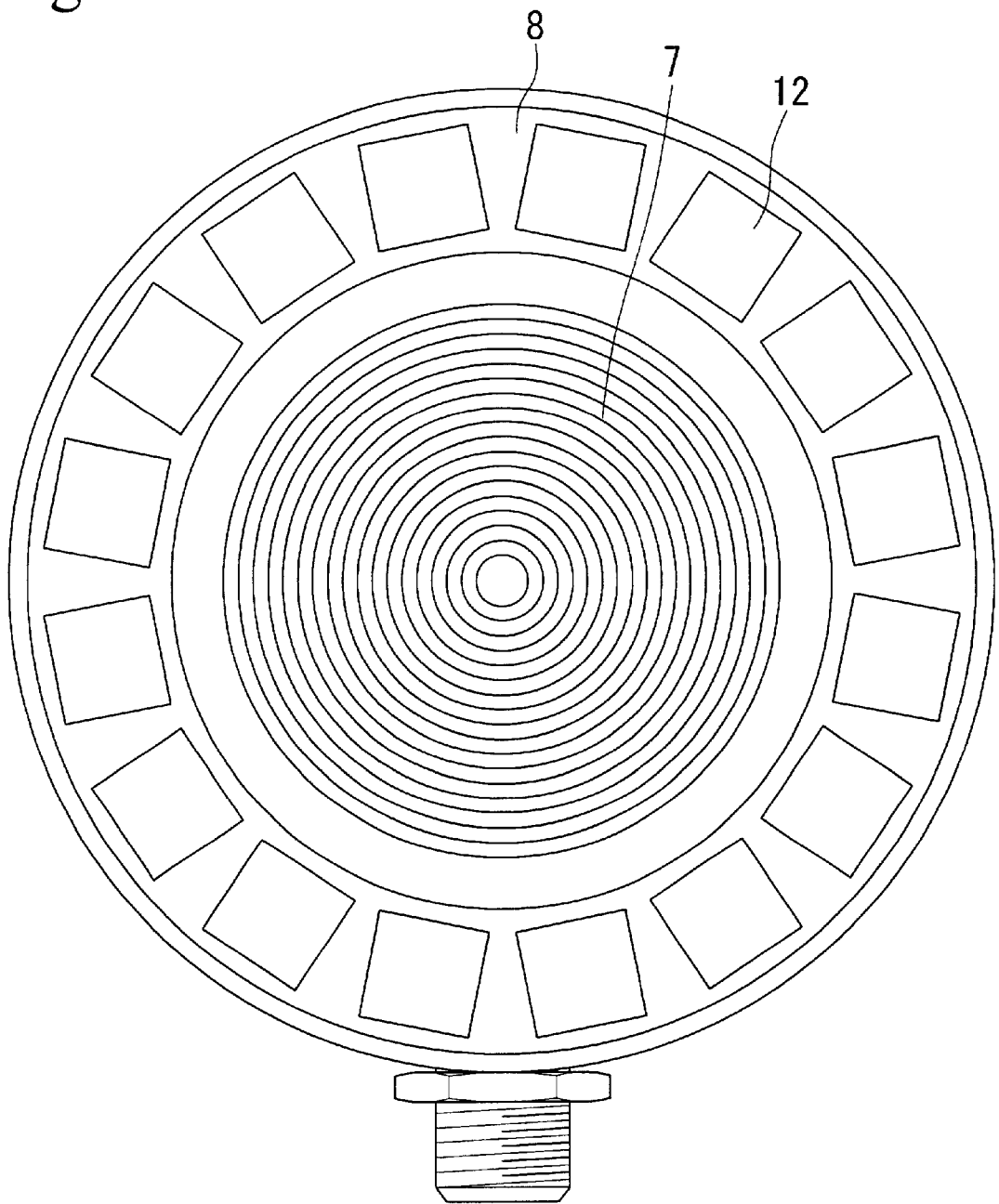
FIG. 5 is a front view of the light emitting device in FIG. 4.

FIGS. 4 and FIG. 5 have the same reference symbol attached to the same material, and show the light emitting device pertaining to the second embodiment of this invention. Suppression ring 8 which sets the second light scattering plate 7 in the main cover 1 is elongated radially compared to the aforementioned first embodiment. On an elongated portion of the suppression ring 8, two or more concavities are formed, spaced in the circumferential direction. Solar panels (solar cells) 11 are set in the two or more concavities. Cover 12 covers the front side of solar panel 11. It is possible to emit light using LED's at a lower cost over a long period by charging the battery with the solar panel 11.

Figure 6:
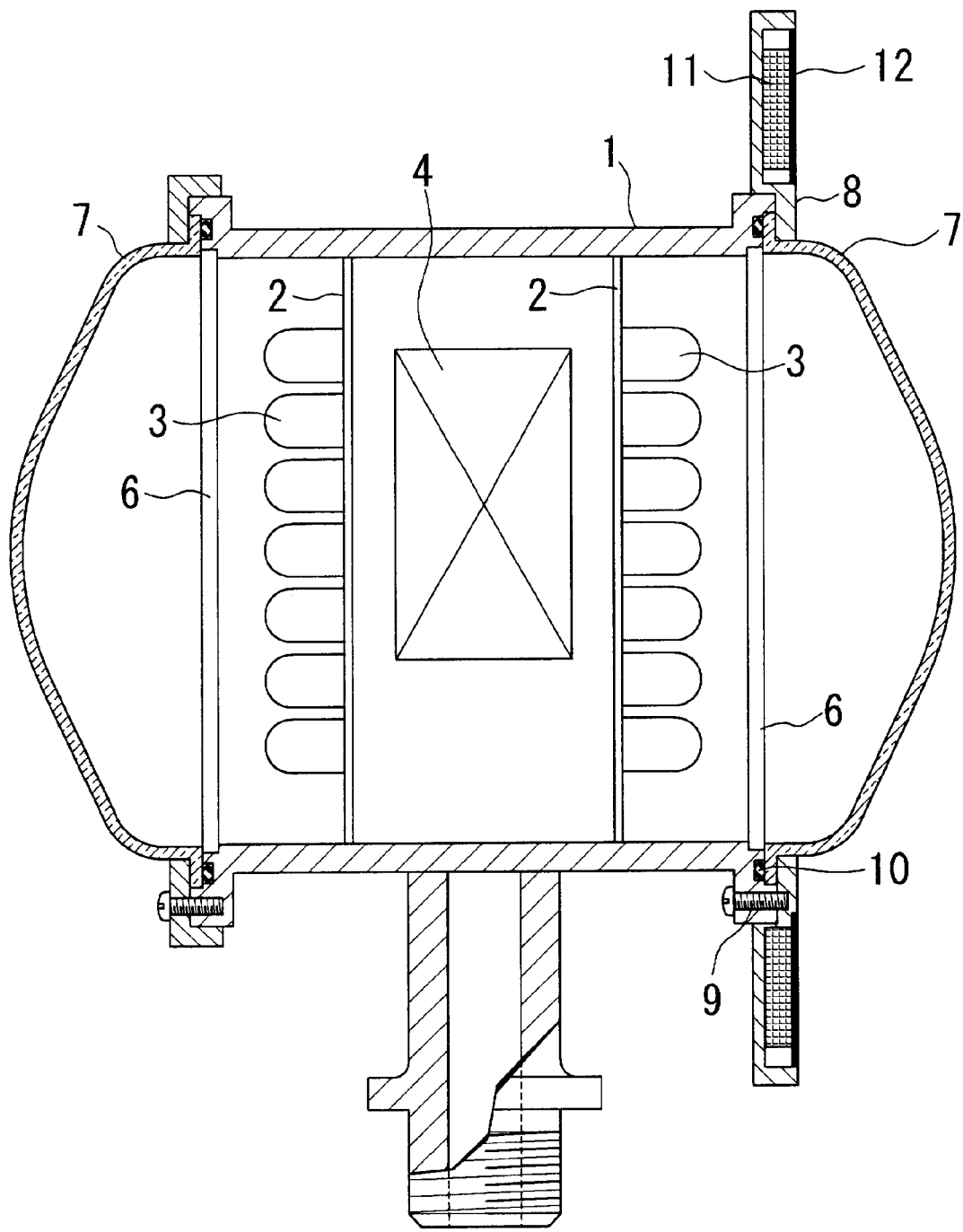
FIG. 6 is a side cross section of the light emitting device according to the third embodiment.

FIG. 6 has the same reference symbol attached to the same material and shows the light emitting device pertaining to the third embodiment of this invention. As seen in FIG. 6, LED elements 3 are disposed on both the right side and left side. This embodiment is suitably adapted to guard rails on the road facing traffic. As for the main cover 1, both ends are made to be opened in a short cylindrical shape. Battery control box 4 is installed in the main cover 1. Two main plates 2 are set in an orthogonal direction with respect to the axis of the main cover 1 with the battery control box 4 in between. Two or more LED elements 3 are installed on the surface of the main plate 2. Two first light scattering plates 6 are installed to conceal the openings of both the right and left ends of main cover 1. The second light scattering plates 7 are installed further outside of the first light scattering plates 6 respectively as seen in FIG. 6. Both first and second light scattering plates extend in an orthogonal direction with respect to the axis of main cover 1. However, concerning the second scattering plate 7, the top thereof is positioned orthogonally with respect to the axis of main cover 1. Moreover, it is possible for the LED elements to be composed of a mixture of LED elements 3 emitting red and blue light. When LED elements 3 with red and blue light which emit the light separately by switch are provided, it can be used as a red and blue signal light.

Figure 7:
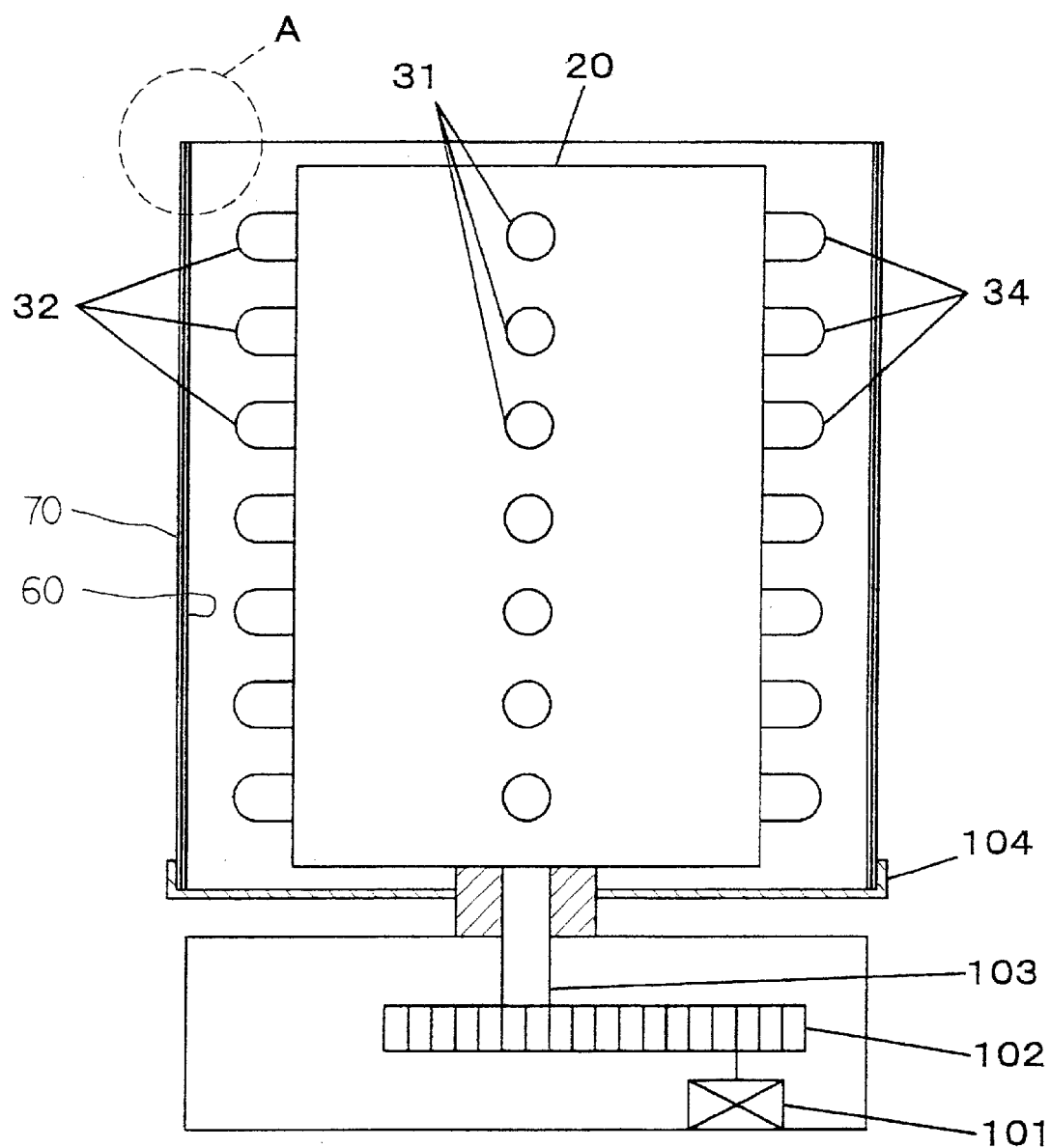
FIG. 7 is a explanatory drawing for the fourth embodiment of this Invention, which refers to the light emitting device including the first and second light scattering plate 60 and 70 and the transparent plate 80 surrounding the main plate 20, cut along the axial direction thereof.
Figure 8:
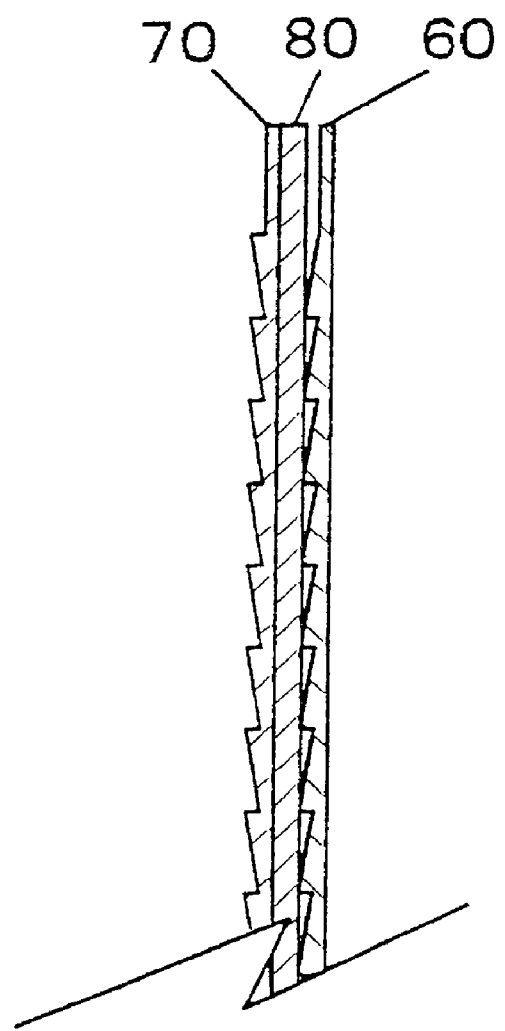
FIG. 8 is an explanatory drawing with the part referred to by the sign A in FIG. 7 enlarged.
Figure 9:
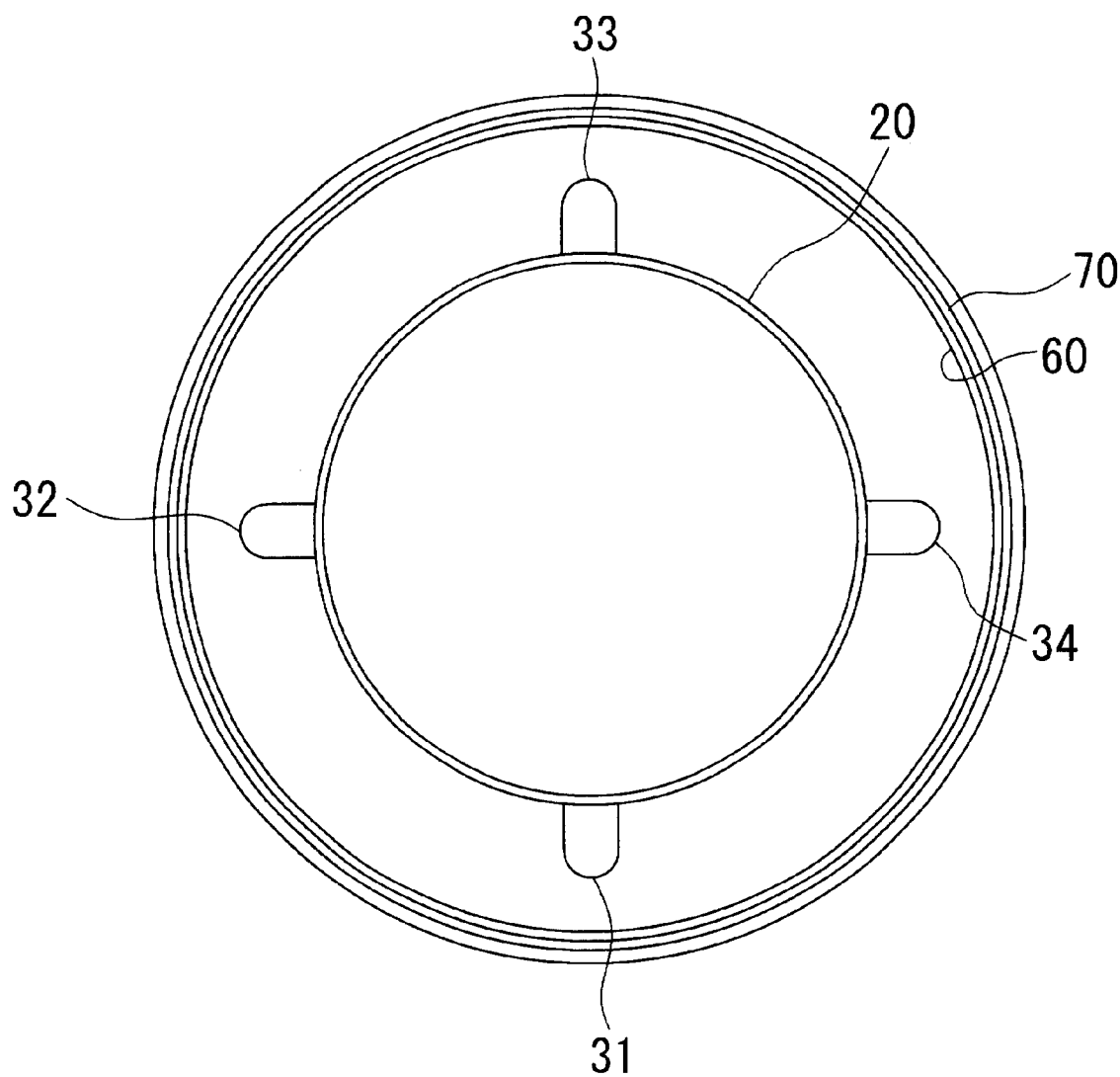
FIG. 9 is a plain view of the light emitting device according to the fourth embodiment of this invention.

FIGS. 7 to 9 show the light emitting device pertaining to the fourth embodiment of the invention. This embodiment has a cylindrical main plate (hereinafter, the word "plate" includes a cylindrical shape) 20 in place of the main plate 2 described above. Four rows of LED elements 31–34 are installed, as shown in FIG. 7 and FIG. 9, on the outside surface of the main plate 20. LED elements 31–34 are spaced along the direction of the axis in each row and at 90 degrees with respect to the circumferential direction. Each row of LED elements 31–34 is set to obtain a different color of luminescence in this embodiment. For example, row of LED elements 31 can be set to red, row of LED elements 32 to blue, row of LED elements 33 to green and row of LED elements 34 to orange. The luminescence color, which can be any color besides the abovementioned combinations such as white, can be selected at the discretion. of the user. That is, the colors of the sources of light are different along the circumferential direction of the main plate 20. As an alternative, LED element(s) with plural luminescence colors from one element can also be used. In this case, the luminescence color of the LED element can be randomly controlled with a control device (not shown in the drawing). Main plate 20 can be rotated in either a clockwise or counterclockwise direction by control motor 101 through shaft 103 and gear 102. The bearing supports the shaft 103. The control motor 101 is designed to rotate the main plate 20 at an arbitrary speed and angle.

The first light scattering plate 60 (refer to FIG. 8) is arranged on the outside of main plate 20. The basic structure of the first light scattering plate 60 is similar to that of the said first light scattering plate 6. However, the striations do not extend in concentric circles but in a mutually parallel direction (the horizontal direction in FIG. 7) in this embodiment. Moreover, the first light scattering plate 60 is, as a whole, formed in a cylindrical shape which is concentric with main plate 20.

The transparent plate 80 having a cylindrical shape and concentric with the first light scattering plate 60 is placed on the outside thereof. Transparent plate 80 is made from transparent materials (for instance, acrylic board) with a hightransmissivity.

The second light scattering plate 70 having cylindrical shape and concentric with the transparent plate 80 is placed on the outside thereof. The structure of the second light scattering plate 70 is almost the same as that of the first light scattering plate 60. However, the inclination of the striations of the second light scattering plate 70 and those of the first light scattering plate 60 are oriented in mutually inverse directions. In other words, the shape of the striations formed on the surface of the first light scattering plate are the inverse of those formed on the surface of the second light scattering plate. This results in improving the effect of light scattering.

The explanation concerning the other structures are omitted for being similar to those of the first embodiment.

Next, the operation of the light emitting device pertaining to this embodiment is explained here. In this embodiment, the arrangement of the first and second light scattering plate 60 and 70 achieve a satisfactory result of spreading the light on the surface because points of light are difficult to discern in the case of using separate light distribution emitted from individual LED elements 31 to 34.

Moreover, the distance from the inside diameter of the first scattering plate 60 to the outside diameter of the second scattering plate 70 is set to about 2 mm in this embodiment. However, the provision of the transparent board 80 between the first scattering plate 60 and second scattering plate 70, to separate the plate 60 from the plate 70, leads to the good effect of light scattering and spreading with better quality although the first and the second scattering plate 60 and 70 are thin.

In addition, in this embodiment, since the color of each of the LED element 31–34 is made different, a device can be obtained which emits an arbitrary color by means of turning the LED elements having the preferred color to the front or to the desired direction.

Figure 10:
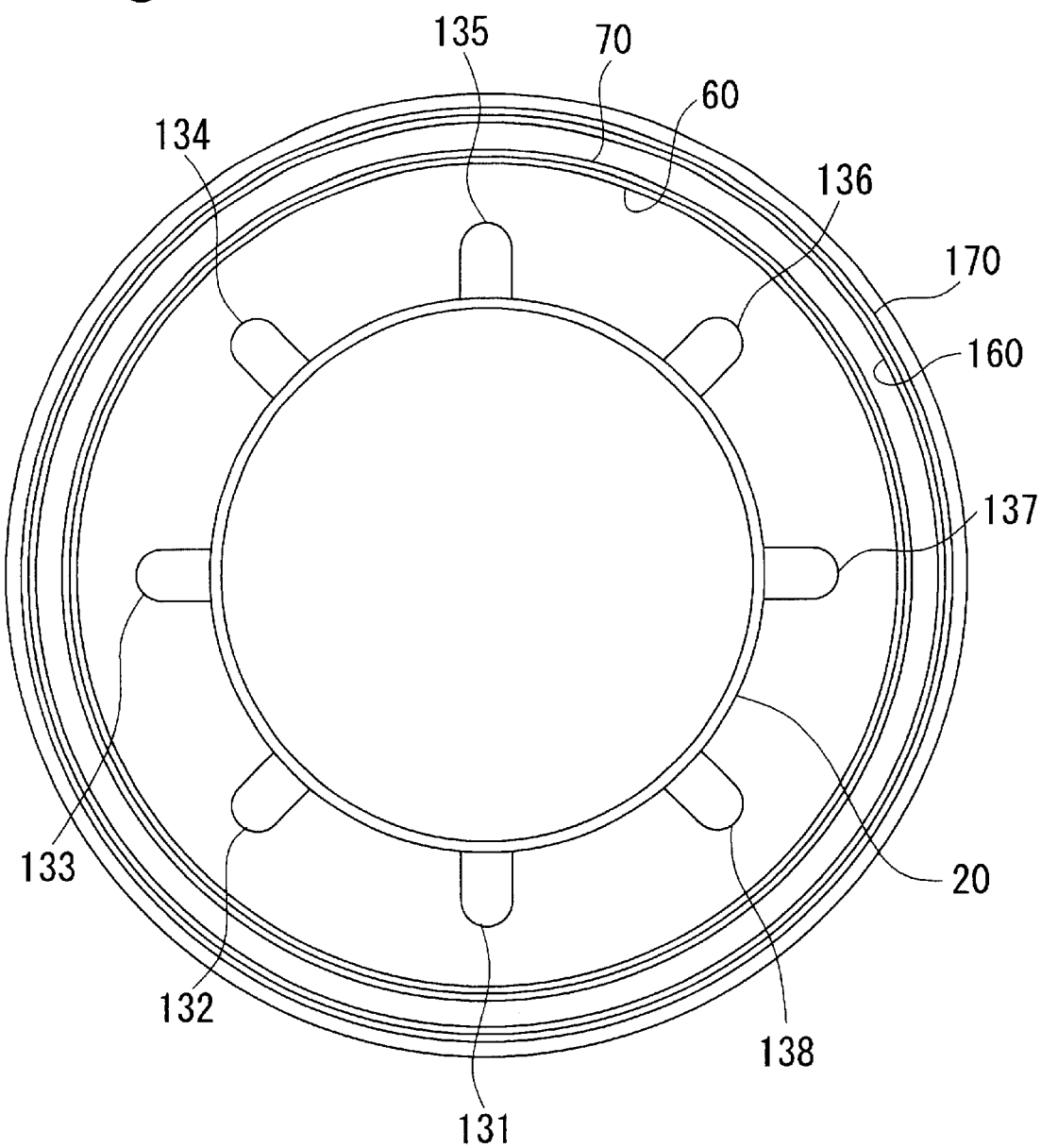
FIG. 10 is a plan view of the light emitting device according to the fifth embodiment of this invention.

Next, the light emitting device pertaining to the fifth embodiment of this invention is explained in accordance with FIG. 10. In this embodiment, the first and the second light scattering plates 160 and 170, and the transparent plate wedged between them is placed at the outside of the second light scattering plate 170. The structure of the first and the second light scattering plates 160 and 170, and the transparent board wedged between them is similar to that of the fourth embodiment except for the diameter thereof. Moreover, eight rows of LED elements 131–138 are installed in this embodiment. The detailed explanation is omitted because the structure other than these is substantially the same as the fourth embodiment described the above.

According to the light emitting device of the fifth embodiment, it is possible to obtain the spread of light with a stronger effect of light scattering than that of the fourth embodiment. Moreover, the structure in the fifth embodiment can obtain strong effects of light scattering in spite of the fact that the first and the second light scattering plates and the transparent board are considerably thin. This has resulted in obtaining a spread of light with still better quality because both of a sufficient amount of light and a strong scattering effect can be obtained. Experiments showed that the lower the height and the smaller the pitch, the more effective the scattering is in the striated prisms in the first and the second light scattering plates.

Figure 11:
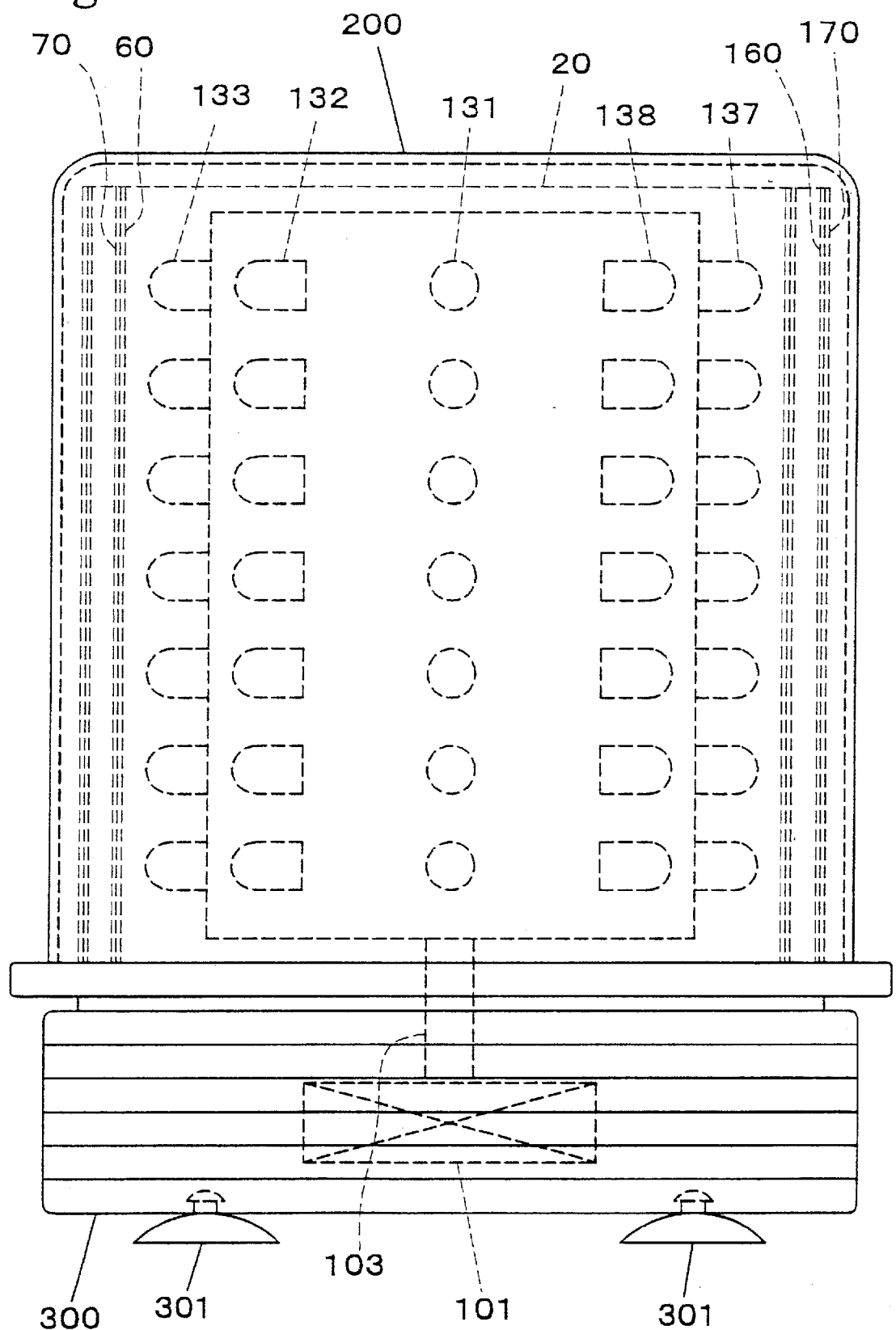
FIG. 11 is a front view of the light emitting device pertaining to the sixth embodiment of this Invention.

Next, the light emitting device pertaining to the sixth embodiment of this invention will be explained in accordance with FIG. 11. A transparent outer cylinder 200 covering the outside of the second light scattering plate 170 is equipped in this embodiment. Moreover, a base 300 storing a motor 101 is equipped and two or more suction cups 301 are attached under it. In addition, in this embodiment, the motor 101 directly drives the shaft 103.

According to the light emitting device of the sixth embodiment, the suction cups are capable of attaching the light emitting device to appropriate fixtures or vehicles on the outside and elsewhere. Moreover, the outer cylinder 200 prevents the inside of the light emitting device from the invasion of insects and rainwater or the like. The detailed explanation is omitted because the structures other than these is practically identical to the fifth embodiment described above.

Figure 12:
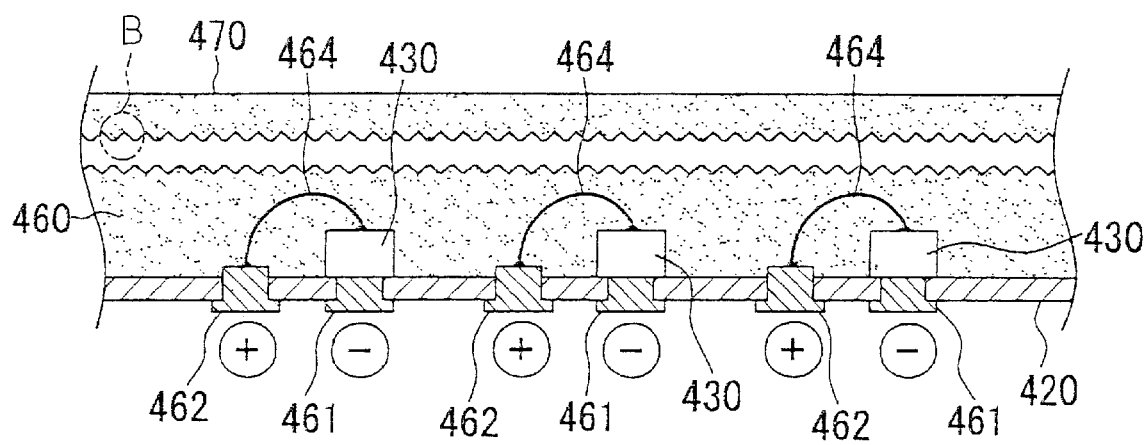
FIG. 12 is a schematic enlarged cross sectional view of a substantial part of the light emitting device pertaining to the seventh embodiment of this invention.
Figure 13:
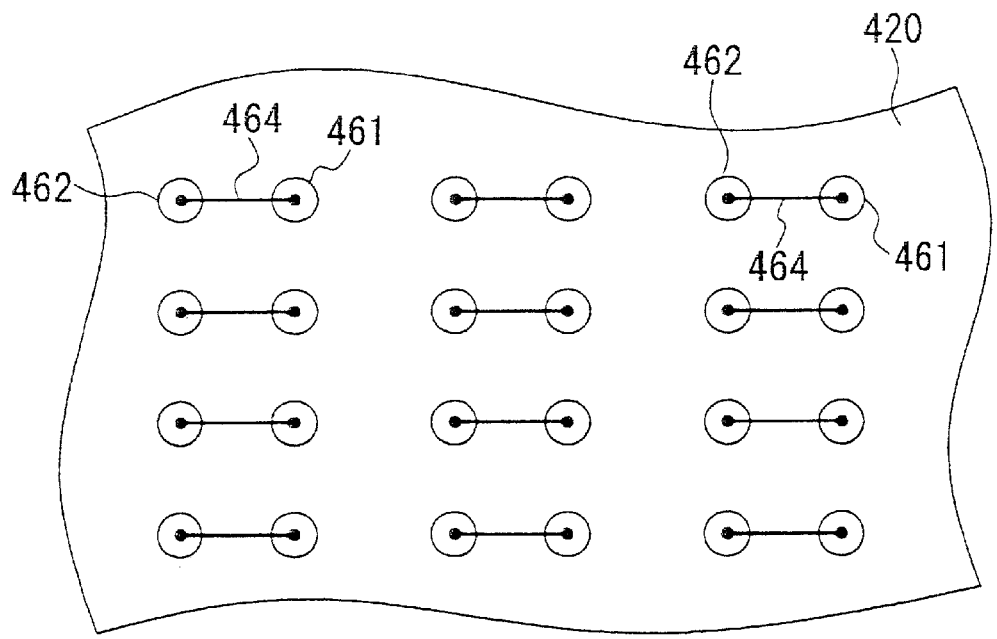
FIG. 13 is an explanatory drawing to explain the arrangement of the electrodes in FIG. 12 as a plan view.

Next, the light emitting device pertaining to the seventh embodiment of this invention is explained in accordance with FIG. 12 and FIG. 13. In this embodiment, a flexible substrate (also called a flexible printed circuit board) 420 is used as a main plate (main body). Two or more pairs of electrodes 461 and 462 are regularly arranged in the substrate 420. A film of aluminum (not shown in the figure) is fixed by deposition (CVD, PVD, or the like) on the substrate 420 (the side from which the light is emitted), and the film is designed to reflect the light which goes to the opposite side. Moreover, an uncovered LED element 430 is used as an LED element or source of light in this embodiment. In the each of the above embodiments, the LED elements were one of the usual type, which are sealed with transparent resin covering the outside of the diode. In the seventh embodiment, LED elements in which the ordinary sealing materials are removed are used. One side of the PN junction of LED element 430 is electrically connected to the electrode 461 of the substrate 420 through proper conductive materials such as solder. The other side of the LED element is electrically connected to the electrode 462 through bonding wire 464. Optional conductive materials can be used as the bonding wire 464. Here, the direction of the light emitted from the LED elements is adjusted to be in the upper direction shown on FIG. 12 (the direction towards the scattering plate). In addition, in this embodiment, the first light scattering plate 460 sealing the LED element 430 from outside is used. More concretely, the first light scattering plate 460 is designed to completely enclose the LED element 430. Striations forming prisms as explained in the above embodiments are made on the upper side of the first light scattering plate 460 (as shown on FIG. 12). The first light scattering plate is molded and hardened by pouring the resin into a suitable mold after the completion of fixation and wiring of LED element 430. The second light scattering plate 470 is arranged above the upper side of the first light scattering plate 460 (as shown on FIG. 12). The structure of this second light scattering plate 470 is basically the same as that of the above-described embodiments. However, it is preferable to use flexible materials for the first and second light scattering plate.

Figure 14:
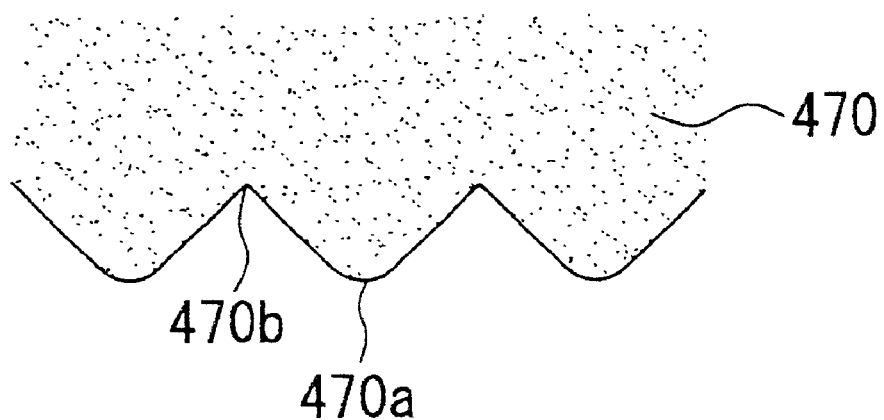
FIG. 14 is an explanatory enlarged drawing of part B shown in FIG. 12.

As shown in FIG. 14, the striations forming prisms on the bottom, surface of the second light scattering plate 470 are shaped such that the top of the bottom side 470a has a sectional arc shape and the top of the upper side of 470b has a sectional acute angle (here, acute angle does not mean that this is not an obtuse angle but does mean that a clear peak exists.) Similarly, the shape of the striations forming prisms on the top surface of the first light scattering plate 460 is the inverse of that of FIG. 14. In other words, the tops of the upper side are sectional arcs and those of the bottom side are sectional acute angles.

The light emitting device in the seventh embodiment has the advantage of enabling the shape to be changed to that of the part of application as required because the main plate 420 is composed of a flexible substrate.

Moreover, the total thickness of the light emitting device can be reduced in this embodiment, because of the structure wherein the LED element 430 does not have a cover (refer to FIG. 12).

In addition, in the light emitting device of this embodiment, the LED elements 430 are protected by the first light scattering plate 460 because it seals the LED elements with respect to the outside. Moreover, the first light scattering plate which serves both for sealing the LED elements and scattering light results in thinning the total thickness of the device furthermore.

The detailed explanation is omitted because the structure other than these is practically the same as the fourth embodiment described above.

Each previous embodiment has been an example of using two scattering plates. However, more than two plates can be also used. Moreover, plate-shaped scattering device have been given as examples. However, sheet-shaped scattering devices are also acceptable. In this case, this invention also can be applied to lighting of display boards for indicator panels, and to use as backlights for liquid crystal displays in the case of a sheet shape.

While preferred embodiments of the present invention have been set forth in detail above, those skilled in the art who have reviewed the present disclosure will readily appreciate that other embodiments can be realized within the scope of the invention. Therefore, the present invention should be construed as being limited only by the appended claims.

The embodiments of the invention in which an exclusive property or privilege is claimed are defined as follows:

1. A light-emitting device comprising:

a cylindrical main cover opened at both ends;

two sheets of a main plate disposed inside said main cover, extending in a direction intersecting the axial direction of said cylindrical main cover;

plural LED elements spaced on the surfaces of the two sheets of said main plate;

a power unit which enables said LED elements to emit light;

two first light scattering plates extending in a direction intersecting the axial direction of said cylindrical main cover, disposed near to each end of said main cover;

two second light scattering plates having a convex shape protruding to the outside, disposed outside each of said first light scattering plates;

wherein a plurality of prisms forming concentric circles are formed on at least one surface of each of said first and second light scattering plate;

and wherein the light emitted from said LED elements is scattered by means of said prisms on the surface of each of said first and second light scattering plate.

2. A light-emitting device according to claim 1, wherein said main plate is made from a flexible substrate.

3. A light-emitting device according to one of claim 1 or 2, wherein said LED element itself has no cover.

4. A light-emitting device according to claim 3, wherein LED elements are sealed within said first light scattering plate.

5. A light-emitting device according to claim 1 or 2, wherein LED elements are sealed within said first light scattering plate.

6. A light emitting device comprising:

a light source for supplying a light;

a first light scattering plate disposed in front of said light source;

a second scattering plate having a convex shape, disposed in front of said first light scattering plate;

wherein at least one surface of each of said first and second light scattering plates is striated so as to form plural prisms in concentric circles;

wherein the light emitted from said light source is scattered by means of said prisms on the surfaces of said first and second light scattering plates; and wherein said light source comprises an LED element, and wherein said LED element itself has no cover.

7. A light emitting device comprising:

a main body having a surface;

plural LED elements disposed on said surface of said main body;

a power unit which enables said LED elements to emit light;

a first light scattering plate disposed substantially in parallel with said surface of said main body, and disposed in front of said LED elements;

a second light scattering plate having a convex shape, disposed in front of said first light scattering plate;

wherein at least one surface of each of said first and second light scattering plates is striated so as to form plural prisms in concentric circles;

wherein the light emitted from said LED elements is scattered by means of said prisms on the surfaces of said first and second light scattering plates; and wherein said LED element itself has no cover.

8. A light emitting device according to claim 7, wherein said main body is made from a flexible substrate.

9. A light emitting device comprising:

a light source for supplying a light;

a first light scattering plate disposed in front of said light source;

a second light scattering plate having a convex shape, disposed in front of said first light scattering plate;

wherein at least one surface of each of said first and second light scattering plates is striated so as to form plural prisms in concentric circles;

wherein the light emitted from said light source is scattered by means of said prisms on the surfaces of said first and second light scattering plates; and wherein said light source is an LED element and said LED element is sealed within said first light scattering plate.

10. A light emitting device comprising:

a main body having a surface;

plural LED elements disposed on said surface of said main body;

a power unit which enables said LED elements to emit light;

a first light scattering plate disposed substantially in parallel with said surface of said main body, and disposed in front of said LED elements;

a second light scattering plate having a convex shape, disposed in front of said first light scattering plate;

wherein at least one surface of each of said first and second light scattering plates is striated so as to form plural prisms in concentric circles;

wherein the light emitted from said LED elements is scattered by means of said prisms on the surfaces of said first and second light scattering plates; and wherein said LED elements are sealed within said first light scattering plate.

11. A light emitting device according to claim 10, wherein said main body is made from a flexible substrate.

12. A light emitting device comprising:

a light source for supplying a light;

plural light scattering devices disposed in front of said light source opposing the direction of propagation of said light;

wherein each of said light scattering devices comprises at least one striation forming plural prisms;

wherein said light is scattered by means of said prisms of said light scattering devices;

wherein said light source is an LED element; and wherein said LED element itself has no cover.

13. A light emitting device comprising:

a main body having a surface;

plural LED elements disposed on said surface of said main body;

a power unit which enables said LED elements to emit light;

a first light scattering plate disposed substantially in parallel with said surface of said main body, and disposed in front of said LED elements;

a second light scattering plate having a convex shape, disposed in front of said first light scattering plate;

wherein at least one surface of each of said first and second light scattering plates is striated so as to form plural prisms in concentric circles;

wherein the light emitted from said LED elements is scattered by means of said prisms on the surfaces of said first and second light scattering plates; and wherein said LED element itself has no cover.

14. A light emitting device comprising:

a main body having a surface;

plural LED elements disposed on said surface of said main body;

a power unit which enables said LED elements to emit light;

a first light scattering plate disposed substantially in parallel with said surface of said main body, and disposed in front of said LED elements;

a second light scattering plate having a convex shape, disposed in front of said first light scattering plate;

wherein at least one surface of each of said first and second light scattering plates is striated so as to form plural prisms in concentric circles;

wherein the light emitted from said LED elements is scattered by means of said prisms on the surfaces of said first and second light scattering plates;

wherein said main body is made from a flexible substrate; and wherein said LED element itself has no cover.

15. A light emitting device comprising:

a main body having a surface;

plural LED elements disposed on said surface of said main body;

a power unit which enables said LED elements to emit light;

a first light scattering plate disposed substantially in parallel with said surface of said main body, and disposed in front of said LED elements;

a second light scattering plate having a convex shape, disposed in front of said first light scattering plate;

wherein at least one surface of each of said first and second light scattering plates is striated so as to form plural prisms in concentric circles;

wherein the light emitted from said LED elements is scattered by means of said prisms on the surfaces of said first and second light scattering plates; and wherein LED elements are sealed within said first light scattering plate.

16. A light emitting device comprising:

a main body having a surface;

plural LED elements disposed on said surface of said main body;

a power unit which enables said LED elements to emit light;

a first light scattering plate disposed substantially in parallel with said surface of said main body, and disposed in front of said LED elements;

a second light scattering plate having a convex shape, disposed in front of said first light scattering plate;

wherein at least one surface of each of said first and second light scattering plates is striated so as to form plural prisms in concentric circles;

wherein the light emitted from said LED elements is scattered by means of said prisms on the surfaces of said first and second light scattering plates;

wherein said main body is made from a flexible substrate; and wherein LED elements are sealed within said first light scattering plate.

* * * * *